(12) United States Patent
Koss et al.

(10) Patent No.: US 11,683,100 B2
(45) Date of Patent: Jun. 20, 2023

(54) SYMBOL GENERATION AND FRAME SYNCHRONIZATION FOR MULTIPULSE-PULSE POSITION MODULATION

(71) Applicant: THE UNITED STATES OF AMERICA, AS REPRESENTED BY THE SECRETARY OF THE NAVY, Arlington, VA (US)

(72) Inventors: Shawn Christian Koss, Carmel Valley, CA (US); Murali Tummala, Monterey, CA (US); John C. McEachen, Carmel, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/509,799

(22) Filed: Oct. 25, 2021

(65) Prior Publication Data
US 2022/0131614 A1    Apr. 28, 2022

Related U.S. Application Data

(60) Provisional application No. 63/104,940, filed on Oct. 23, 2020.

(51) Int. Cl.
*H04B 10/524*    (2013.01)
*H04L 7/00*    (2006.01)

(52) U.S. Cl.
CPC ......... *H04B 10/524* (2013.01); *H04L 7/0075* (2013.01)

(58) Field of Classification Search
None
See application file for complete search history.

(56) References Cited

U.S. PATENT DOCUMENTS

2007/0211786 A1\* 9/2007 Shattil ................ H04L 27/2601
                                                                  375/147
2016/0323056 A1\* 11/2016 Park ........................ H04L 27/04

OTHER PUBLICATIONS

Velidi et al.: Frame Synchronization for Optical Multi-pulse Pulse Position Modulation, IEEE Transactions on Communications, vol. 43, No. 2/3/4, Feb./Mar./Apr. 1995, pp. 1838-1843 (Year: 1995).\*

(Continued)

*Primary Examiner* — Li Liu
(74) *Attorney, Agent, or Firm* — Naval Postgraduate School; Scott Bell

(57) ABSTRACT

A method and system for multipulse-pulse position modulation optical transmission that includes selecting a multipulse-pulse position modulation having a symbol alphabet having an upper-bound symbol alphabet size, and determining, based on at least one transmission characteristic associated with a transmitter, a subset of symbols of the selected symbol alphabet capable of being transmitted by the transmitter, the subset of symbols having a set of binary codewords. The method and system may include identifying two-symbol concatenation of binary codewords in the set of binary codewords, calculating a cross correlation of binary codeword in the set of binary code words through every two-symbol concatenation, determining a set of one or more acceptable codeword combinations by eliminating a portion of two-symbol concatenation of codewords corresponding to overlapping peaks in the respective calculated cross correlations, and transmitting, by the transmitter via an optical communication channel, information encoded based on the determined acceptable codeword combinations.

20 Claims, 14 Drawing Sheets

(56) References Cited

OTHER PUBLICATIONS

Velidi etal: On Symbol Synchronization of MPPM Sequences, IEEE Transactions on Communications, vol. 46, No. 5, May 1998, pp. 587-589 (Year: 1998).*
Fujiwara: Self-Synchronizing Pulse Position Modulation With Error Tolerance, IEEE Transactions on Information Theory, vol. 59, No. 9, Sep. 2013, pp. 5352-5362 (Year: 2013).*
Ghosna etal: Pulse position modulation coding schemes for optical intersatellite links, Electronics Letter, Feb. 18, 2010, vol. 46 , No. 4. (Year: 2010).*
Simon et al.: Multi-Pulse Pulse-Position-Modulation Signaling for Optical Communication with Direct Detection, IPN Process Report 42-155, Nov. 15, 2003, pp. 1-22 (Year: 2003).*
Chumchewkul, D. Performance Evaluation of VPPM Visible Light Communications Based on Simulation with Experiment's Parameters. 2018 15th International Conference on Electrical Engineering/ Electronics, Computer, Telecommunications and Information Technology (ECTI-CON).
Li, Jing et al. Dual-Pulse Pulse Position Modulation (DPPM) for Deep-Space Optical Communications: Performance and Practicality Analysis NASA/TM-2012-216042. Nov. 2012.
Rathod, Abhay B., Gulhane, Snajay M., Padalwar, Shailesh R. A Comparative Study on Distance Measuring Approaches for Permutation Representations. 2016 IEEE International Conference on Advances in Electronics, Communication and Computer Technology (ICAECCT) Rajarshi Shahu College of Engineering, Pune India. Dec. 2-3, 2016.

* cited by examiner

SYMBOL GENERATION AND FRAME SYNCHRONIZATION FOR MULTIPULSE-PULSE POSITION MODULATION

CROSS-REFERENCE

This Application is a nonprovisional application of and claims the benefit of priority under 35 U.S.C. § 119 based on U.S. Provisional Patent Application No. 63/104,940 filed on Oct. 23, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Research and Sponsored Programs Office, Halligan Hall, Room 230, Naval Postgraduate School, Monterey, Calif. 93943-5138, referencing NPS Case No. 20200011.

TECHNICAL FIELD

The present disclosure is related to a method and system to generate nonoverlapping self-synchronizing multipulse-pulse position modulation MPPM symbols with periodic markers to assist with transmission, synchronization, and detection.

BACKGROUND

Wireless optical signals present many challenges to effective communications that if overcome can present new possibilities for data transmission. Lights consume seventeen percent of all commercial buildings' electricity in the United States [1]. The ability to harness this electrical power as a form of data transmissions would greatly increase energy efficiency and reduce operating costs. There is an area of study dedicated to this task called visible light communications (VLC) that refers to short-range optical wireless transmission using the visible light spectrum from 380 to 780 nm to transmit data by intensity modulating optical sources faster than the persistence of the human eye [2]. FIG. 1 presents a 2017 energy study based on a quadrennial commercial building survey that identifies the various types of building lights in use. While the data may appear somewhat dated, the report still conveys the various types of lighting used throughout many buildings. These are fluorescent, incandescent, high-intensity discharge, halogen, and light-emitting diodes [1]. Each lighting type has unique operating characteristics that if used as a simplex transmitter may be considered when developing modulation techniques. Pulse position modulation (PPM) is a general signal propagation method studied and employed in optical communications.

Pulse position modulation (PPM) is a discontinuous time-based analog signal propagation technique that preserves the advantages of duration modulation while correcting some of its wasteful power properties [3]. A breakout of various types of discontinuous carrier wave modulation techniques is shown in FIG. 2, where PPM is shown at the bottom in an oval, adapted from [15]. This efficient approach is commonly used in optical communications where a digital input determines the position of a single, narrow pulse relative to an unmodulated clocking interval [3, 4]. Throughput efficiency and capacity advantages increase greatly with a generalized form of PPM called multipulse-pulse position modulation (MPPM) that maps a digital input to a symbol with more than a single pulsed slot per frame interval [5-7]. MPPM studies indicate its useful capabilities for optical communications but highlight some limitations.

One intrinsic challenge with MPPM is the synchronization of individual time slots or entire frames when transmitted over optical channels [5, 7]. The inability to synchronize MPPM frames may result in loss of entire information streams. Studies show that with an overlapping observation window, an incorrect application of symbol choice further complicates frame synchronization in MPPM transmissions [5-8]. An example of an overlapping observation window is shown in FIG. 3, where the MPPM symbol is observed through an overlapping observation window, adapted from [7]. Some effort has been conducted to identify self-synchronizing symbols that may be called nonoverlapping, meaning those that when observed via overlapping window do not present a valid symbol choice and can be unambiguously identified when received over a noiseless channel [7].

Frame Synchronization

Aspects described herein build upon the methods introduced and apply novel techniques for MPPM symbol generation. Transmitted data packets are organized into frames as shown in FIG. 4 with Q time slots and length based on transmitter operating characteristics [4]. Frame synchronization is one of the most basic tasks in which receivers delineate frame start and stop locations to extract data. Added-bit framing is a common method to induce frame synchronization by adding a control bit or pattern of bits called markers to each frame to allow a receiver to successively compare incoming bits to an expected pattern until it finds a match [4]. While this method is effective whether frames are transmitted with or without gaps, it adds unwanted overhead to frame patterns that decrease data throughput and require additional management.

MPPM is typically analyzed using continuous frame transmission, which normally allows for the development of methods to decrease some existing overhead programmed into symbol definitions [5-8]. However, one method demonstrated frame synchronization error rates between $10^{-5}$ and $10^{-9}$ at a signal-to-noise ratio (0-3 dB) using pulse width modulated VLC, but it included significant overhead with the addition of start bits, stop bits, and an idle pattern before and after the information package as a control channel. Though it provided sufficient frame synchronization results, the data throughput proved to be only 25 kbps [8]. The addition of the large control channel greatly reduced data throughput when compared to methods that have significantly smaller control-channels, such as self-synchronizing codes. This may be considered during the symbol generation phase.

Self-synchronizing codes are binary block codes where the symbol string formed by an overlapped portion of any two concatenated codewords is not a valid codeword. Frame synchronization is enabled through the property that no single codeword exists within an overlapped viewing window of any two adjacent codewords. These self-synchronizing or nonoverlapping codes are a subset of the total symbol alphabet generated based on symbol length and number of pulses per frame. Nonoverlapping codes work well with receiver direct detection methods [5, 10, 11].

Direct detection methods occur after the receiver synchronizes slot and symbol. In [10], the author defines direct detection for a PPM scheme; however, the present disclosure expands that definition to encompass MPPM schemes as well. Embodiments described herein define a (Q, n) MPPM symbol of length Q slots with n pulsed positions that are determined by a pulse code modulated codeword that yields an upper-bound symbol alphabet size [5-8] of $$M(Q, n) = \binom{Q}{n} \qquad (1)$$

FIG. 5 depicts an example MPPM alphabet with (4, 2)=6 [5]. A direct detection receiver can identify which of the noncoded symbols is transmitted by determining the location of n pulses over Q slots. It then performs an inverse mapping operation to recover the transmitted bit stream [10]. Direct detection methods prove advantageous for long-haul optical transmission, such as inter-satellite, lunar, and deep space communications [11]. The additional contribution to include markers to self-synchronizing MPPM symbols has improved their ability to operate with direct detection receivers [5].

In view of the above, there exists a need for a solution to generate nonoverlapping self-synchronizing MPPM.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Aspects described herein provide for symbol generation and frame synchronization of multipulse-pulse position modulation techniques to transmit binary data over noisy optical communication channels. Pulse modulation techniques characteristically inhibit frame synchronization; therefore, the present disclosure integrates concepts such as added-bit framing, inclusion of periodic markers, and self-synchronizing codes to reduce the inherent frame synchronization challenges associated with pulse position modulation. Through the development of four symbol generation features and the introduction of standard symbol variables, the present disclose provides for a method to create symbols based on various transmitter, channel, or receiver's operating characteristics. Results include the tabulation of symbol size based on practical transmission characteristics and provide a solution set of nonoverlapping symbols available for transmission over optical channels. Simulations using low bit-count messages demonstrate successful transmission with channel interference modeled by a Poisson random process with an arrival rate of 0.32.

The present disclosure provides for a method for multi-pulse-pulse position modulation optical transmission. The method may include selecting a multipulse-pulse position modulation having a symbol alphabet having an upper-bound symbol alphabet size, each symbol in the symbol alphabet having a first quantity of pulse slots per frame (Q) and second quantity of pulsed positions in each frame (n), and determining, based on at least one transmission characteristic associated with a transmitter, a subset of symbols of the selected symbol alphabet capable of being transmitted by the transmitter, the subset of symbols having a set of binary codewords. The method may include identifying every two-symbol concatenation of binary codewords in the set of binary codewords, calculating a cross correlation of every binary codeword in the set of binary code words through every two-symbol concatenation, and determining a set of one or more acceptable codeword combinations by eliminating a portion of two-symbol concatenation of codewords corresponding to overlapping peaks in the respective calculated cross correlations. The method may include transmitting, by the transmitter via an optical communication channel, information encoded based on the determined acceptable codeword combinations.

The present disclosure provides for a system for multi-pulse-pulse position modulation optical transmission. The system may include a processing device configured to select a multipulse-pulse position modulation having a symbol alphabet having an upper-bound symbol alphabet size, each symbol in the symbol alphabet having a first quantity of pulse slots per frame (Q) and second quantity of pulsed positions in each frame (n), and determine, based on at least one transmission characteristic associated with a transmitter, a subset of symbols of the selected symbol alphabet capable of being transmitted by the transmitter, the subset of symbols having a set of binary codewords. The processing device may be configured to identify every two-symbol concatenation of binary codewords in the set of binary codewords, calculate a cross correlation of every binary codeword in the set of binary code words though every two-symbol concatenation, and determine a set of one or more acceptable codeword combinations by eliminating a portion of two-symbol concatenation of codewords corresponding to overlapping peaks in the respective calculated cross correlations. The system may include a transmitter configured to transmit, via an optical communication channel, information encoded based on the determined acceptable codeword combinations.

The present disclosure provides for a non-transitory computer readable medium comprising computer code for multipulse-pulse position modulation optical transmission, the computer code, when executed by a processor, performing steps. The steps may include selecting a multipulse-pulse position modulation having a symbol alphabet having an upper-bound symbol alphabet size, each symbol in the symbol alphabet having a first quantity of pulse slots per frame (Q) and second quantity of pulsed positions in each frame (n), and determining, based on at least one transmission characteristic associated with a transmitter, a subset of symbols of the selected symbol alphabet capable of being transmitted by the transmitter, the subset of symbols having a set of binary codewords. The steps may include identifying every two-symbol concatenation of binary codewords in the set of binary codewords, calculating a cross correlation of every binary codeword in the set of binary code words though every two-symbol concatenation; and determining a set of one or more acceptable codeword combinations by eliminating a portion of two-symbol concatenation of codewords corresponding to overlapping peaks in the respective calculated cross correlations. The steps may include causing transmission, by the transmitter via an optical communication channel, information encoded based on the determined acceptable codeword combinations.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present disclosure provides for one or more self-synchronizing MPPM schemes used with direct detection optical receivers. In some embodiments, aspects describe a method and system to generate nonoverlapping self-synchronizing MPPM symbols with periodic markers to assist with transmission, synchronization, and detection.

The present disclosure provides for MPPM techniques using sequences of pulsed-light to transmit binary data and deliver information through a noisy optical terrestrial or free-space communication channel. The present disclosure provides for synchronization of MPPM frames by inserting a single pulse in the first time slot of every frame. The results demonstrate an effective and generalized solution set of self-synchronizing symbols that operate when a transmitter is unable to generate light pulses during consecutive slot periods. The transmission of consecutive frames, without gaps, creates a periodic signal that can be identified by a witting receiver.

Self-Synchronizing MPPM Scheme

Figure 1:
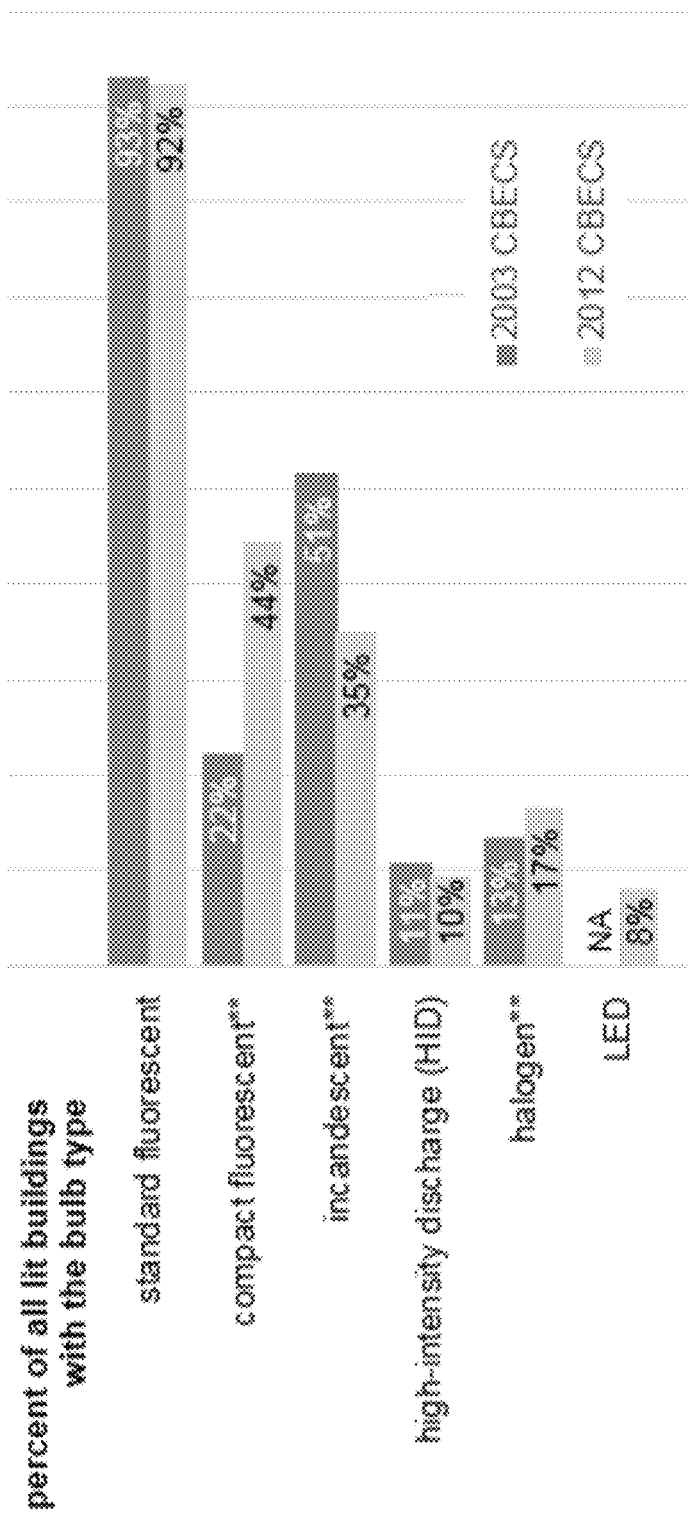
FIG. 1 is a graph showing an energy study based on a quadrennial commercial building survey that identifies the various types of building lights in use, in accordance with one or more disclosed aspects.
Figure 2:
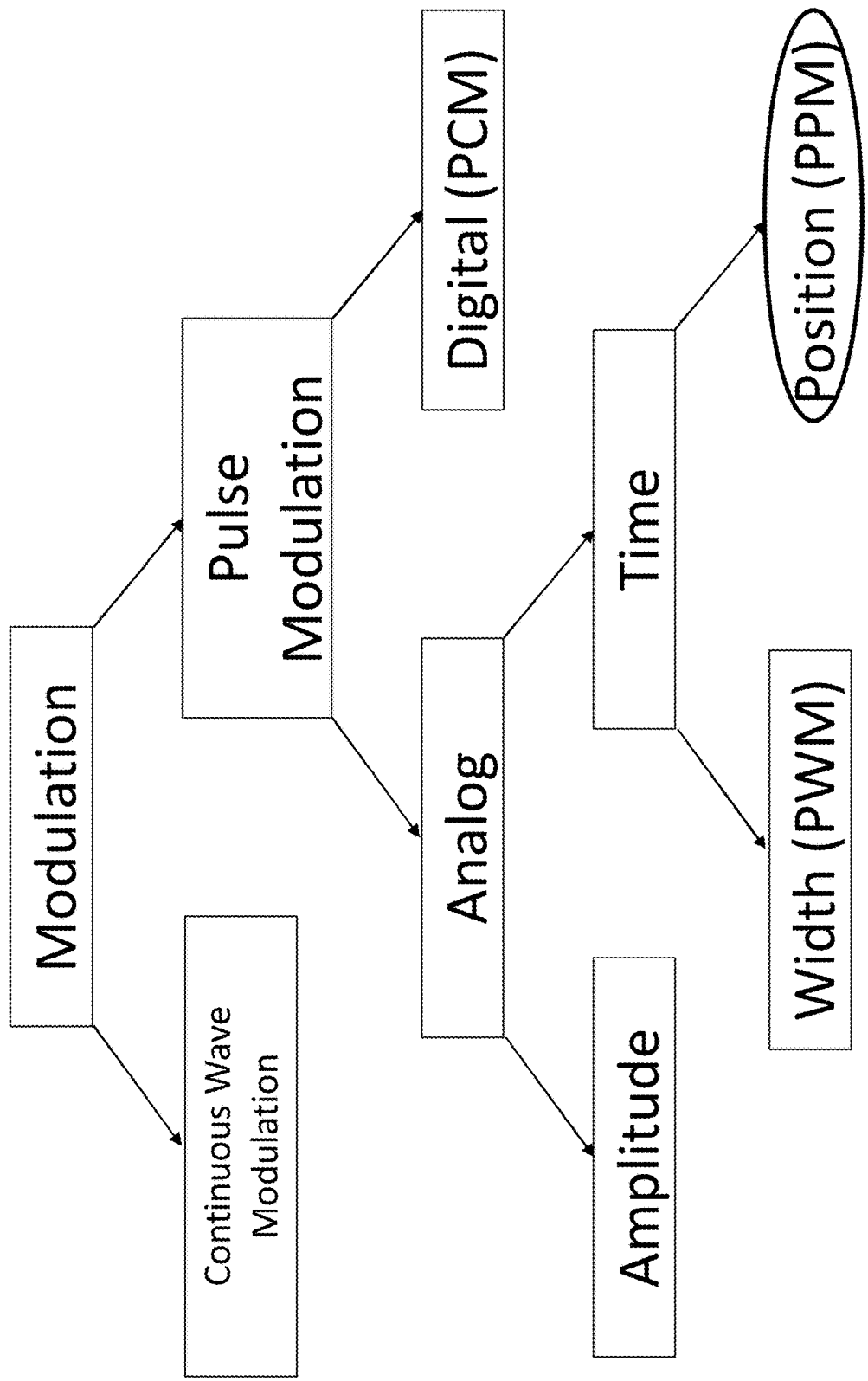
FIG. 2 is a schematic diagram showing a breakout of various types of discontinuous carrier wave modulation techniques, in accordance with one or more disclosed aspects.
Figure 3:
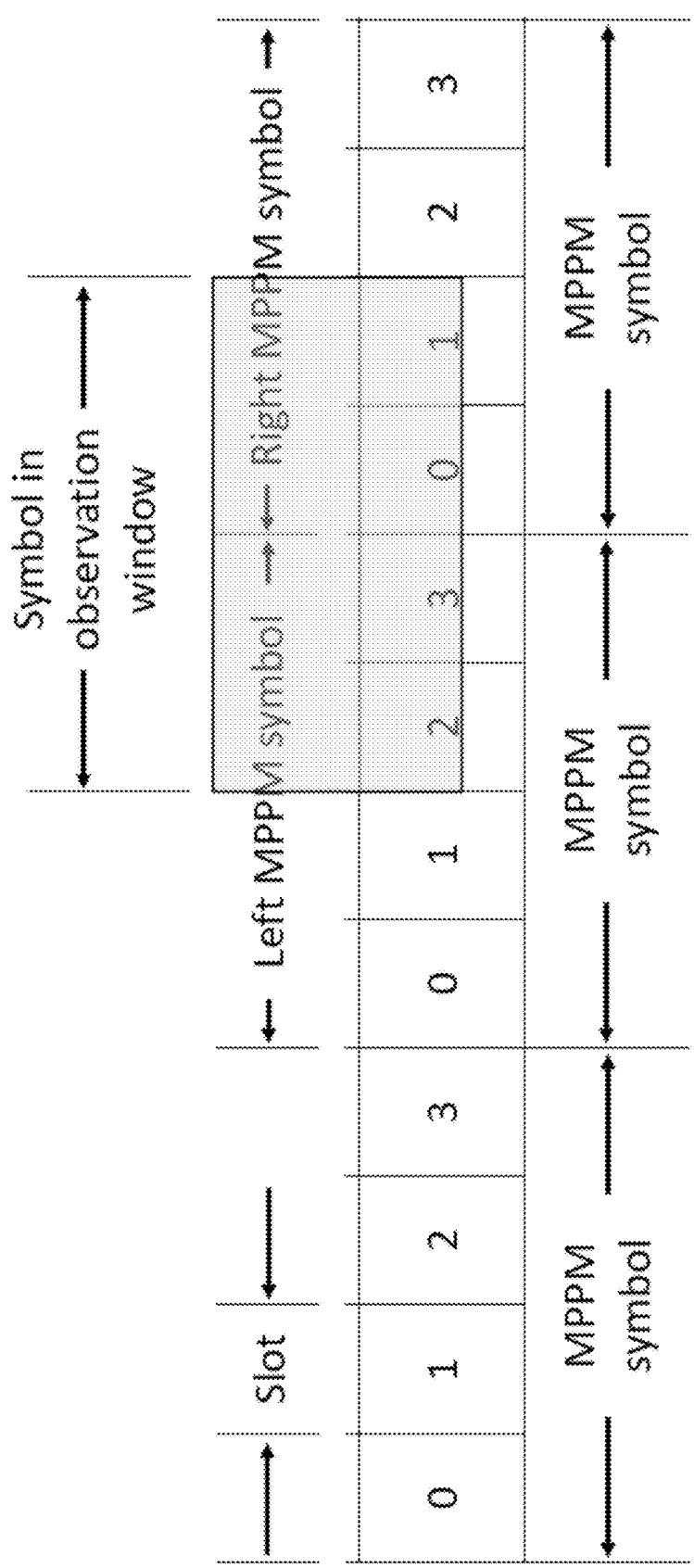
FIG. 3 is a schematic diagram showing an example of an overlapping observation window, in accordance with one or more disclosed aspects.
Figure 4:
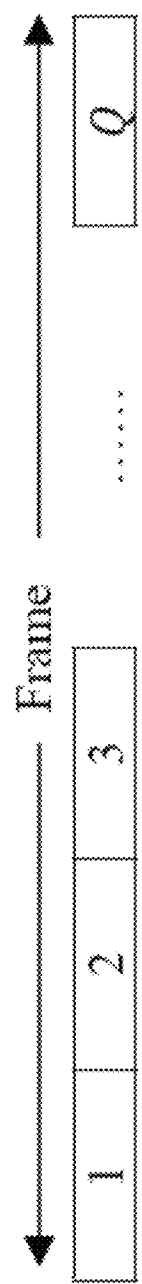
FIG. 4 is a schematic diagram of a data frame, in accordance with one or more disclosed aspects.
Figure 5:
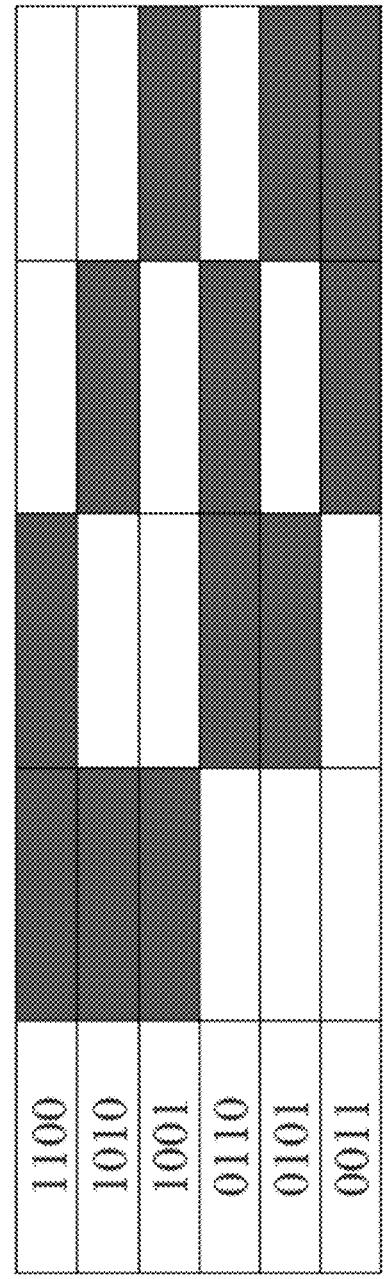
FIG. 5 is a schematic diagram of an example MPPM alphabet, in accordance with one or more disclosed aspects.
Figure 6:
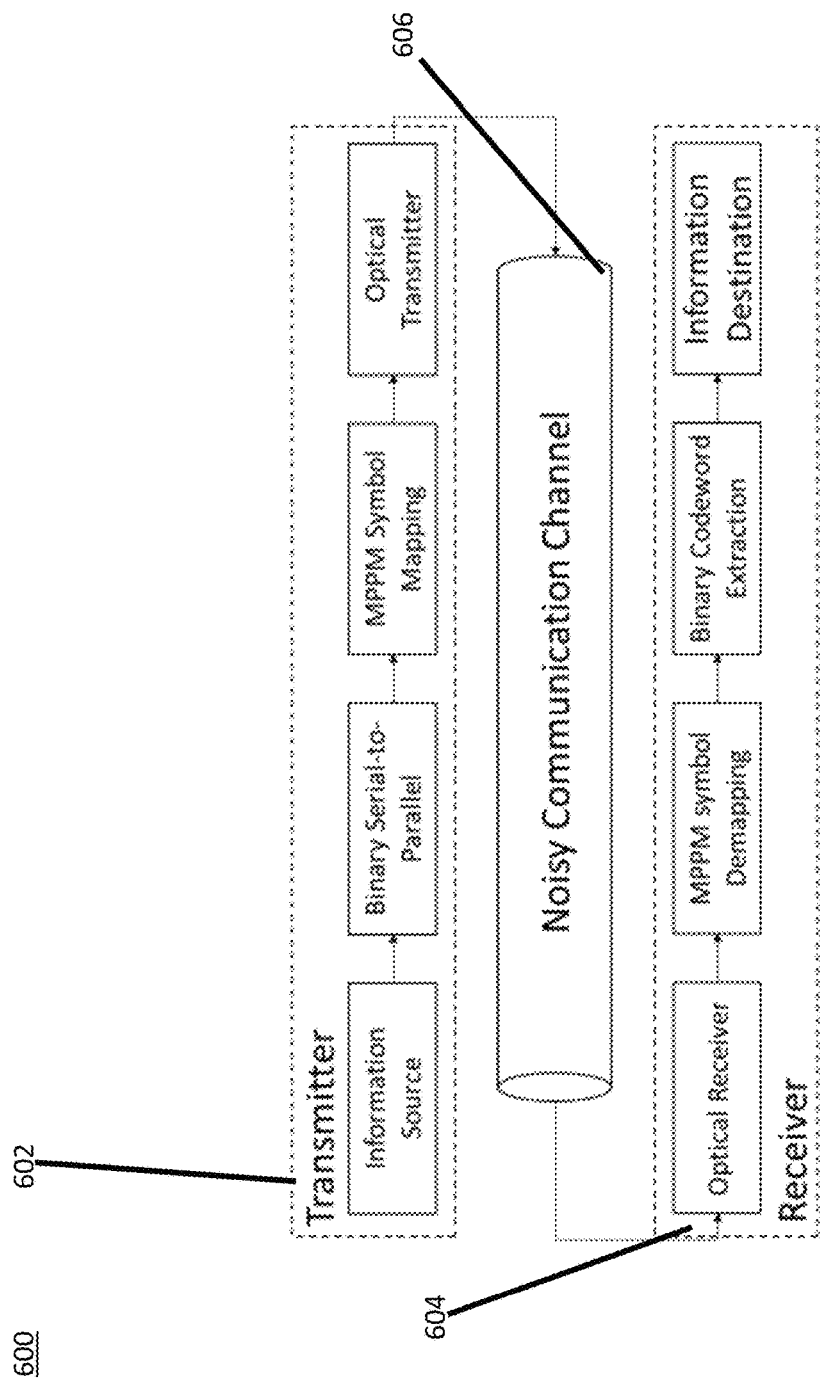
FIG. 6 is a block diagram of an example system for multipulse-pulse position modulation optical transmission, in accordance with one or more disclosed aspects.

FIG. 6 is a schematic flow diagram showing a system 600 for transmitting and receiving MPPM signals through an optical communication channel. The system 600 may include a transmitter 602, a receiver 604, and a communication channel 606, which may be a noisy communication channel in this example. The information source is relayed through the transmitter 602 serially where a controller translates the information into parallel arrays of m-bit binary codewords where the size of m depends on the number of available symbols.

The transmitter 602 maps the binary codewords to unique symbols, arranges them serially, and transmits them through an optical communication channel 606. The receiver 604 identifies the symbol, conducts a reverse mapping operation to match each symbol with their binary representations, and processes them into human or machine readable information.

The translation of information to binary codewords occurs based on a predetermined number of nonoverlapping (Q, n) MPPM symbols. If there are s(Q, n) nonoverlapping symbols in an S(Q, n) symbol alphabet, then the transmitter can map m bits per symbol where $$m = \lfloor \log_2(s(Q, n)) \rfloor \quad (2)$$

The controller may have an available solution set before it can determine the number of bits per symbol or identify the appropriate (Q, n) combination. The development and identification of nonoverlapping symbols might include one or more of the following four features.

A. Features

1. There Exists a Minimum of $2^m$ Unique Nonoverlapping Sequences for Each m Bits Transmitted Per Symbol Equation (1) defines the upper-bound symbol alphabet size; however, transmitter characteristics will reduce the upperbound to M'(Q', n'). Unfortunately, all of the remaining M' symbols might not satisfy the nonoverlapping criteria; therefore, symbol generation may identify the sets of nonoverlapping symbols within M' available for transmit. The set of nonoverlapping symbols may be labeled $S_{(Q,n)}$, where its dimensions determine the number of bits allocated per symbol. Transmitter characteristics greatly impact this decision, thus a transmitter capable of transmitting m bits may find an acceptable (Q, n) combination with $2^m$ symbols. Conversely, a transmitter that may operate within a specific (Q, n) combination may only transmit m bits based on (2) where $s_{(Q,n)}$ is the unique number of nonoverlapping symbols.

2. Pulse Width Equals One Time Slot; However, there Exists a Minimum Number of Slots to Discharge Consecutive Pulses that Exceed One Time Slot that we Term Pulse Cost.

Conceivably, a transmitter's practical operating characteristics may prevent consecutive pulses during subsequent time slots. Symbol development may account for a transmitter's ability to generate successive pulses, which may include charging the pulse generator, discharging the pulse, and any cooling-off period the transmitter might use before it can generate a subsequent pulse. The minimum slot time to transmit consecutive pulses is groin while the minimum frame length Q—lower bound may be represented by $$Q_{lb} = nq_{min} \quad (3)$$

and is a function of the number of pulses and the minimum slot times to transmit each pulse.

3. Time Slot Width τ is Constant and Measured in Seconds Per Slot; Therefore, all Sequences with a Constant Frame Length Must have the Same Number of Q Time Slots.

Total frame length Q slots is dependent on the number of pulses and amount of padding x added to each frame. With constant padding, fewer pulses result in shorter frame lengths but limit the total number of available nonoverlapping symbols. Holding pulses per frame constant and allowing padding to increase results in nonlinear growth of nonoverlapping symbols, increases the number of bits per symbol, and increases frame length.

4. Symbols Begin with a Pulse.

We introduce a unitary pulse at the beginning of each frame to control synchronization. When multiple frames are transmitted consecutively without gaps, the singular initial pulse forms a periodic signal every Q time slots that a witting receiver can identify and synchronize. This method satisfies the conditions introduced in Section II and minimizes the negative effects on data throughput. The first pulse may be called the synchronization pulse, and the (n−1) additional pulses may be called the symbol pulses (see FIG. 7). Slot placement of the symbol pulses determine their unique symbol.

B. Symbol Generation

The following notation is used in describing symbol generation:

Q— Niunber of slots per frame represented:
τ— Tau represents slot time, measured in units of time:
n— Integer pulses per frame strictly greater than one:
$q_{min}$— Pulse length lower bound. measured in time slots:
x— Total padding time slots added to each frame such that $x=\Sigma_{i=1}^{n} x_i$ where $x_i$ is the number of padding time slots added after the $i^{th}$ pulse: and
$T_s$— Symbol length measured in units of time. $T_s=Q\tau$.

Figure 7:
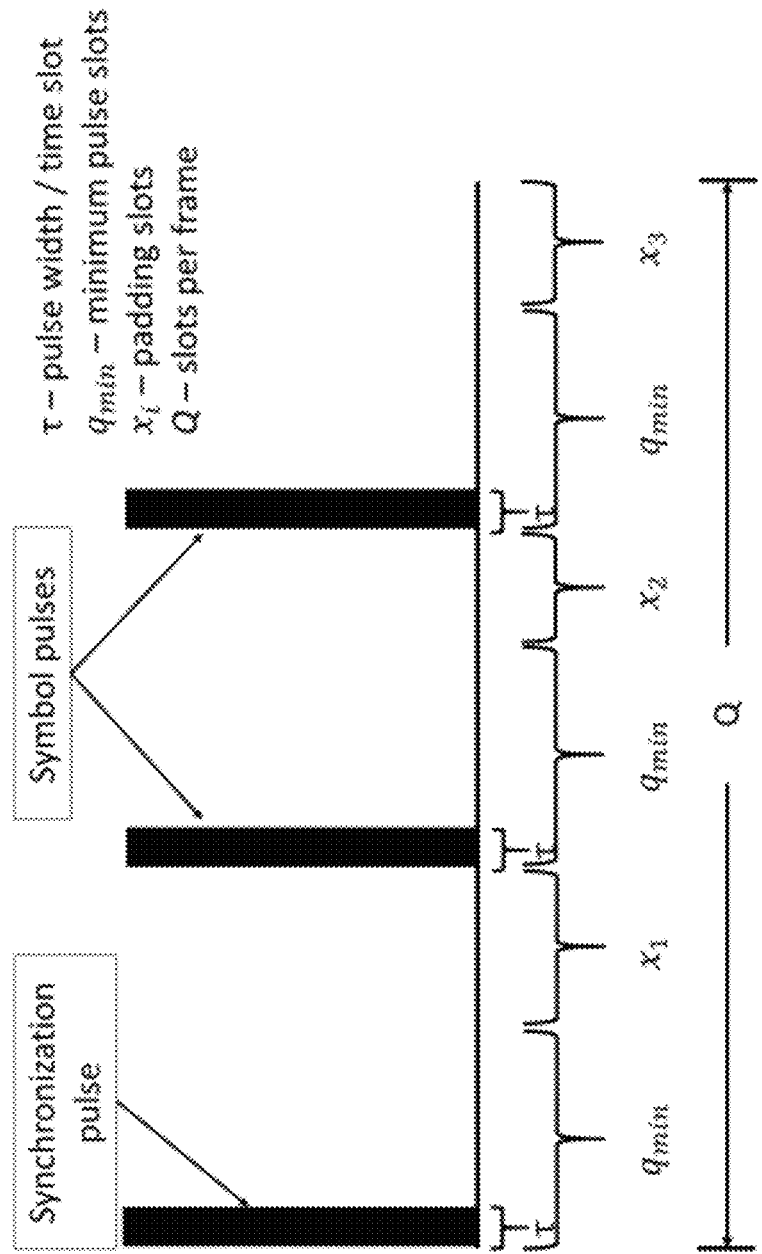
FIG. 7 is a diagram of an example symbol frame, in accordance with one or more disclosed aspects.

FIG. 7 depicts an example symbol for (Q, 3) where $Q=Q_{lb}+x$. Reordering this equation and substituting for $Q_{lb}$ allows for the calculation of total padding slots $$x = Q - nq_{min} \quad (4)$$

for finite frame lengths based on the number of pulses per frame.

Without a transmitter's consecutive pulse characteristics, the number of symbols may be calculated by using (1). However, applying features 1-4 reduces the total number of available symbols for each (Q, n) combination to $$M'_{(Q,n)} = \binom{Q'}{n'} \quad (5)$$

where Q'=(n−1)+x and n'=(n−1). Nevertheless, the total symbols determined by (5) may overlap and may be further analyzed to identify the nonoverlapping subset.

C. Self-Synchronization

Figure 8:
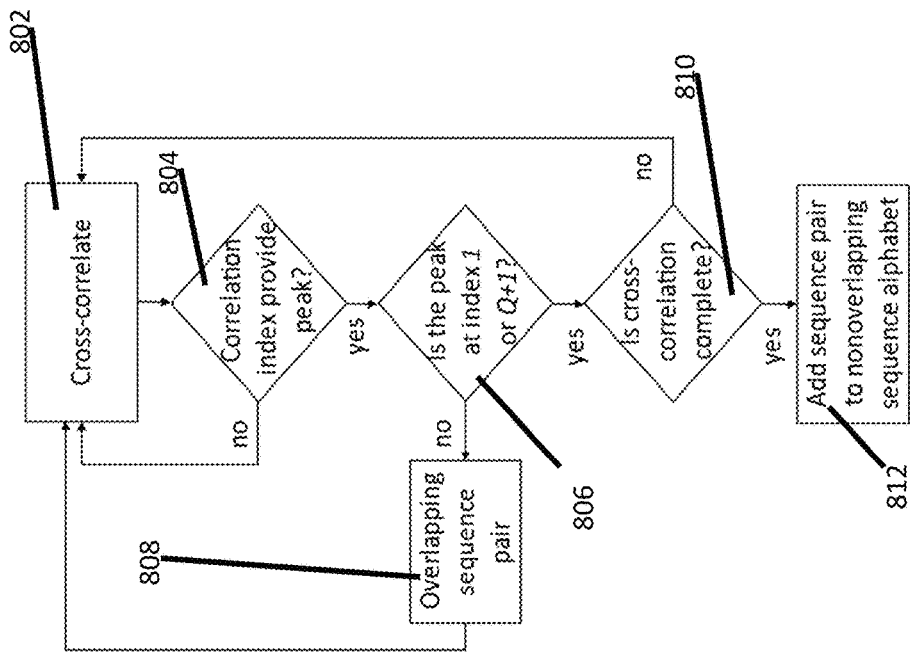
FIG. 8 illustrates an exemplary method for eliminating overlapping symbols, in accordance with one or more disclosed aspects.

FIG. 8 describes an example method 800 for eliminating overlapping symbols. As shown in FIG. 8, self-synchronizing symbols may be determined and/or identified through further reduction of the set created with (5) by cross correlating (step 802) each symbol in M' with every two-symbol concatenation of M' as follows. Let $Z_{(Q,n)}$ be the set of codewords in a (Q, n) combination and $z_i$ be a specific codeword where $$z \in Z_{(Q,n)} | z_i = \{z_1, \ldots, z_{M'}\}, \quad (6)$$

We define $Y_{(Q,n)}$ as the set of all two-symbol concatenations of codewords within the set $Z_{(Q,n)}$ where $$y \in Y_{(Q,n)} | y_j = \bigcup_{i,k=1}^{M'} z_i z_k \quad (7)$$

or written another way, $y_j=\{z_1 z_1, \ldots, z_1 z_{M'}, z_2 z_1 \ldots, z_{M'} z_{M'}\}$. Let $\phi_{(Q,n)}$ be the set of cross correlations of every codeword in $Z_{(Q,n)}$ through every two-symbol concatenation in $Y_{(Q,n)}$ according to [12]

$$\phi_{z_i y_j}[q] = \sum_{r=-\infty}^{+\infty} z_i[r+q] y_j[r]. \quad (8)$$

At step 804, after the cross correlation is calculated for every binary codeword in the set of binary code words through every two-symbol concatenation, peaks are identified in the cross correlation values. If an index in the associated frame does not correspond to a peak, the process may return to step 802. If an associated index provides a peak, then at step 806, it is determined whether the peak is at index location 1 (i.e., the first pulse location in the frame) or at index value (Q+1) (e.g., in a different frame, such as the first slot in a subsequent frame). If not, then the sequence pair is identified as an overlapping sequence pair at step 808, and the process may return to step 802. If at step 806, if it is determined that the peak is at index location 1 (i.e., the first pulse location in the frame) or at index value (Q+1) (e.g., in a different frame, such as the first slot in a subsequent frame), then the process may continue to step 810, where it is determined whether the cross-correlation has completed. If not, the process may return to step 802; otherwise, the process may continue to step 812. At step 812, the corresponding sequence pair may be added to the nonoverlapping sequence alphabet.

Eliminating codewords that provide overlapping peaks at $$(\phi_{z_i y_j} \text{ or } \phi_{z_k y_j}) | y_j \cup \{z_i z_i, z_i z_k, z_k z_i, z_k z_k\} \quad (9)$$

determine the acceptable codeword combinations. The solution set of nonoverlapping symbols can be defined as $S_{(Q,n)}$, where a specific solution with w nonoverlapping symbols is defined as $$s \in S_{(Q,n)} | s_i = \{z_i z_k \ldots z_w\}. \quad (10)$$

The process described in this section removes overlapped symbols and allows the receiver to identify the synchronization pulse thus greatly enhancing symbol identification. The receiver can follow a similar process to demap symbols as shown in FIG. 9.

Figure 9:
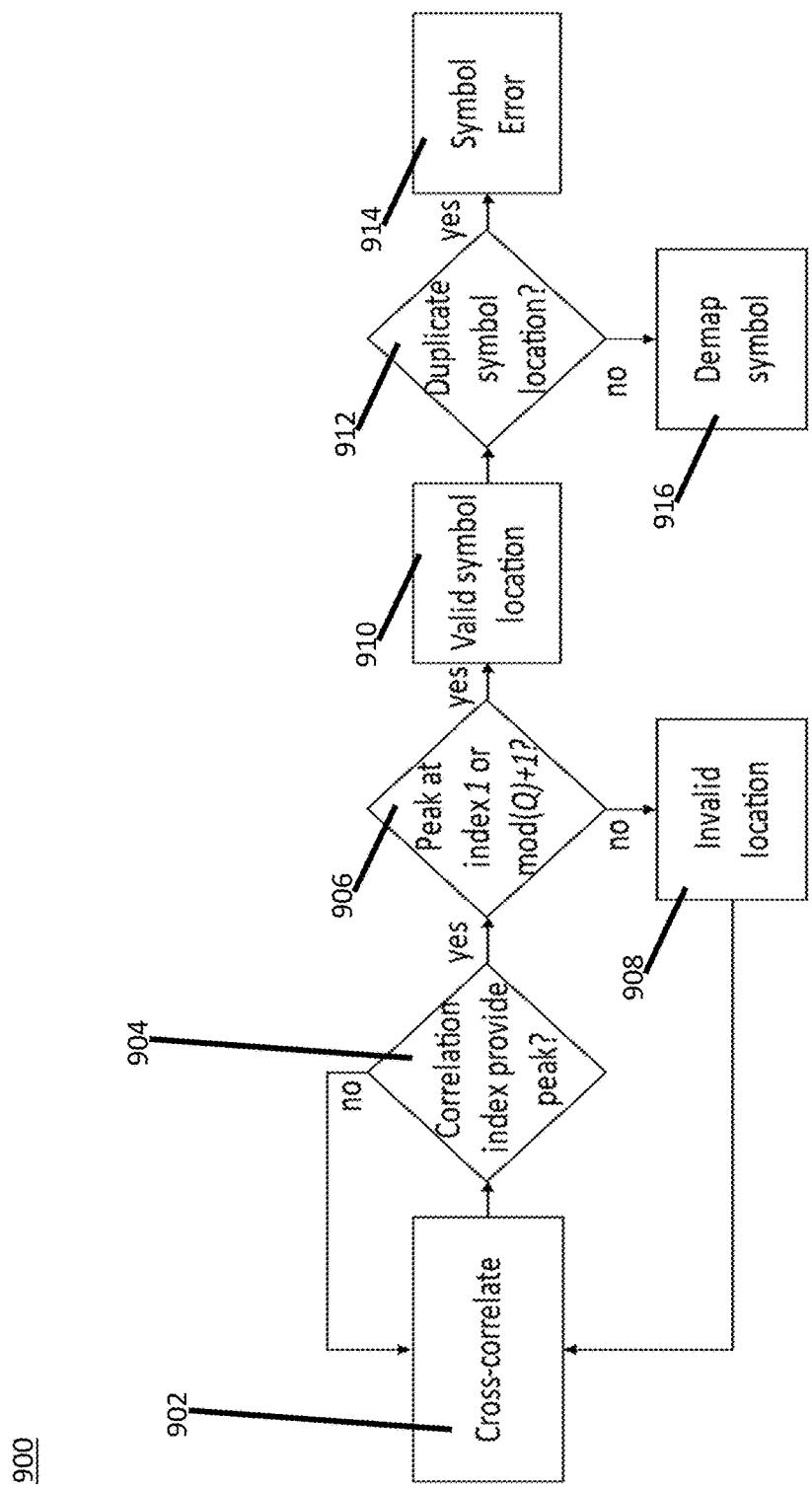
FIG. 9 illustrates an exemplary method for a receiver reverse mapping transmitted symbols, in accordance with one or more disclosed aspects.

FIG. 9 illustrates an example method 900 of a receiver reverse mapping transmitted symbols. At step 902, the receiver may cross correlate the received symbols with the expected transmitted symbols from within the symbol alphabet, such as described herein with respect to the transmitter. At step 904, the receiver determine whether an index in the associated frame corresponds to a peak. If not, then the process may return to step 902. If an associated index provides a peak, then at step 906, it is determined whether the peak is at index location 1 (i.e., the first pulse location in the frame) or at index value (Q+1) (e.g., in a different frame, such as the first slot in a subsequent frame). If not, then the receiver determines that the index location is an invalid location, and the process returns to step 902. If it is determined that the peak is at index location 1 (i.e., the first pulse location in the frame) or at index value mod(Q)+1 (e.g., in a different frame, such as the first slot in a subsequent frame), then the process may continue to step 910, where it is determined that it is a valid symbol location. At step 912, it is determined whether there may be duplicate symbols at one or more valid locations. If so, the process continues to step 914, where a symbol error may be computed. If at step 912, it is determined that the symbol is not a duplicate, the process may continue to step 916, where the receiver may demap the symbol to recover the encoded information (bits).

Figure 10:
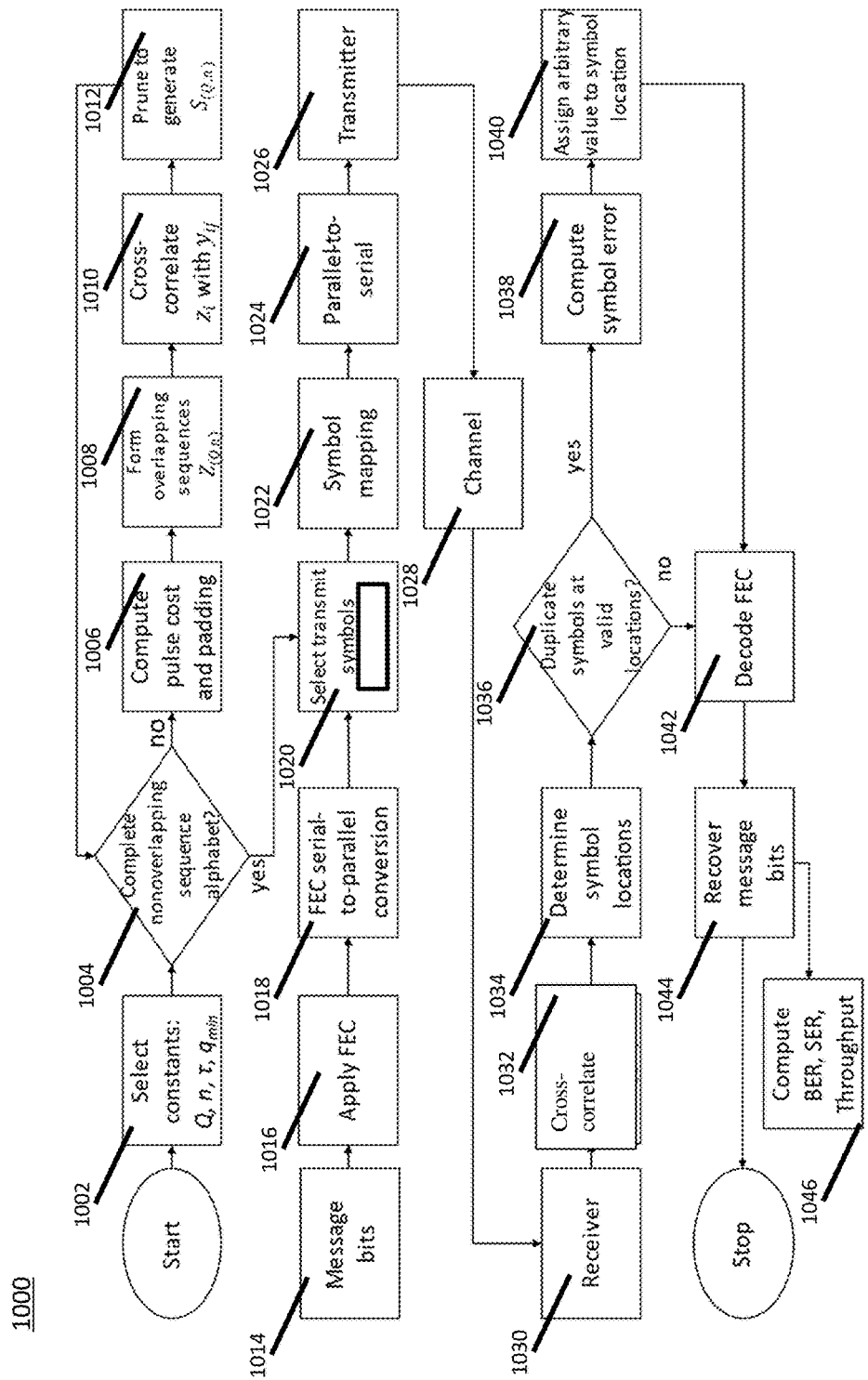
FIG. 10 illustrates an exemplary method for generating, transmitting, and receiving encoded information, in accordance with one or more disclosed aspects.

The present disclosure provides a system of algorithms that follow the process(es) described above. FIG. 10 shows a flow process 1000 providing an example of the above process(es) described above and herein. For example, process 1000 may be a method that includes generating non-overlapping sequences, converting message bits to symbols, transmitting symbols over a noisy channel, receiving and evaluating the received signal, and recovering the intended message bits.

Process 1000 may begin at step 1002, where the constants Q, n, τ, and $q_{min}$, may be selected. At step 1004, it is determined whether the associated alphabet forms a complete nonoverlapping sequence. If not, the process continues to step 1006, where the pulse cost and the padding for each frame is computed. At step 1008, overlapping sequences may be formed, and at step 1010, cross-correlations of each symbol with every two-symbol concatenation is calculated.

At step 1012, a set of one or more acceptable codeword combinations is determined by eliminating or pruning a portion of two-symbol concatenation of codewords corresponding to overlapping peaks in the respective calculated cross correlations. The process may return to step 1004. At step 1004, if it determined that the associated alphabet does form a complete nonoverlapping sequence, the process continues to step 1020. At step 1014, the information (message bits) intended to be sent through the communication channel may be identified, and at step 1016, a forward error correction (FEC) technique may be applied to the information.

At step 1018, the information (bits) may be converted from serial to parallel. At step 1020, the symbols that will be used to transmit the information are selected, where the information may be in binary codeword format. In some cases, a distance (e.g., Hamming and/or Manhattan distances) may be used to compare differences between codewords, which may be used in the selection of the transmit symbols (discussed more in detail below). At step 1022, the transmitter may map the binary codewords to unique symbols using the nonoverlapping alphabet. At step 1024, the symbols may be arranged serially, and the transmitter may transmit (step 1026) the symbols through a channel (step 1028), to a receiver. The receiver may receive the transmitted symbols (step 1030), and at step 1032, may perform a reverse mapping operation. Based on the reverse mapping, the receiver may determine the symbol locations in step 1034.

At step 1036, the receiver determines whether there may be duplicate symbols at one or more valid locations. If not, the process continues to step 1042. If the receiver determines that there may be duplicate symbols at valid location(s), a symbol error may be computed at 1038, and an arbitrary value may be assigned to the corresponding symbol location for each duplicate location. The process may continue to step 1042. At step 1042, the forward error corrected bits are decoded, and at step 1044, the information (bits) may be recovered. At step 1046, the bit error rate (BER), the symbol error rate (SER), and/or the throughput may be determined. The process may end.

In one example, the constants τ=0.5 units of time and $q_{min}$=6τ can be established. Table 1 utilizes (5) to display the number of unique symbols M' within the (Q, n) combinations that range from Qeven=[14:32] and n=[2:5].

TABLE 1

| M'(Q, n) for $Q_{even}$ = [14:32] and n = [2:5] | | | | |
|---|---|---|---|---|
| (Q ↓, n →) | 2 | 3 | 4 | 5 |
| 14 | 3 | — | — | — |
| 16 | 5 | — | — | — |
| 18 | 7 | — | — | — |
| 20 | 9 | 6 | — | — |
| 22 | 11 | 15 | — | — |
| 24 | 13 | 28 | — | — |
| 26 | 15 | 45 | 10 | — |
| 28 | 17 | 66 | 35 | — |
| 30 | 19 | 91 | 84 | — |
| 32 | 21 | 120 | 165 | 15 |

Null values exist where the symbol period does the experimental constants for τ and $q_{min}$ based on n pulses.

We analyzed the (Q, n) combination (20,3) and calculated the number of padding slots from (4) resulting in x=2 time slots as follows $$\begin{pmatrix} x_{z_1,t} \\ x_{z_2,t} \\ x_{z_3,t} \\ x_{z_4,t} \\ x_{z_5,t} \\ x_{z_6,t} \end{pmatrix} = \begin{pmatrix} 0 & 0 & 2 \\ 0 & 1 & 1 \\ 0 & 2 & 0 \\ 1 & 0 & 1 \\ 1 & 1 & 0 \\ 2 & 0 & 0 \end{pmatrix}.$$

Figure 11:
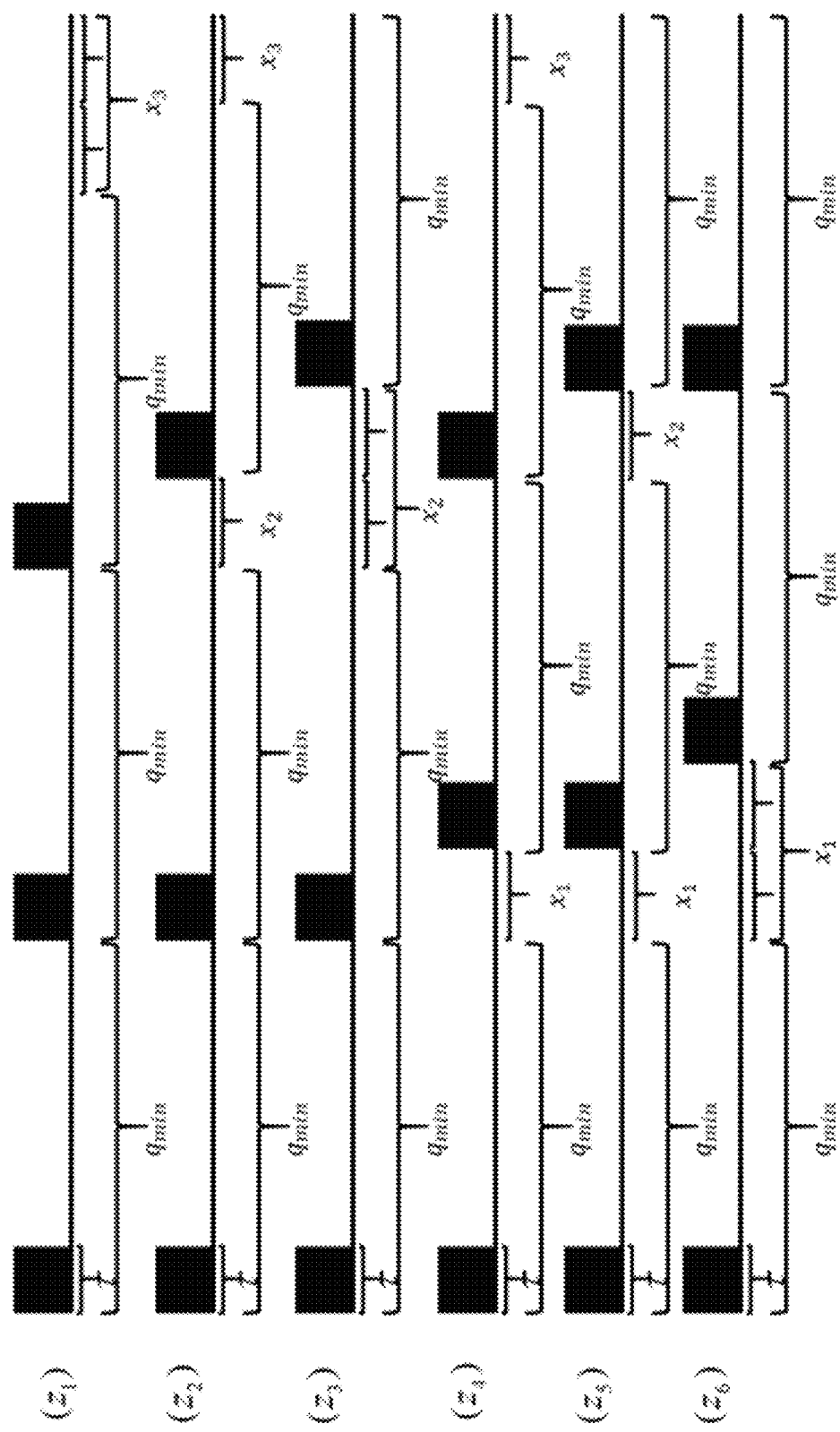
FIG. 11 is a diagram illustrating exemplary pulse locations of unique symbols, in accordance with one or more disclosed aspects.

Consequently, there are $$M'_{(20,3)} = \binom{(n-1)+x}{(n-1)} \qquad (12)$$

unique symbols, where M'=6. Inserting the appropriate padding from (11) yields the set of six unique symbols $Z_{(20,3)}$ available for transmit as displayed in Table 2. The 5's represent slot locations where a pulse is generated and the 0's where no pulse is generated. FIG. 11 illustrates exemplary pulse locations in each of these six unique symbols in this example.

Next, the set $Y_{(20,3)}$ may be formed that contains a total of 36 two-symbol concatenations of $z_0$ through $Z_6$ from Table 2 and conducted a symbol-wise cross correlation of each symbol $z_{[1:6]} \in Z_{(20,3)}$ through each $y_{[1:36]} \in Y_{(20,3)}$. This formed the set $\phi_{(20,3)}$ with example results displayed in Table 3.

TABLE 2

| $z_i \downarrow$, q $\rightarrow$ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $z_1$ | 5 | 0 | 0 | 0 | 0 | 0 | 5 | 0 | 0 | 0 | 0 | 0 | 5 | 0 | 0 | 0 | 0 | 0 | 0 | 0 |
| $z_2$ | 5 | 0 | 0 | 0 | 0 | 0 | 5 | 0 | 0 | 0 | 0 | 0 | 0 | 5 | 0 | 0 | 0 | 0 | 0 | 0 |
| $z_3$ | 5 | 0 | 0 | 0 | 0 | 0 | 5 | 0 | 0 | 0 | 0 | 0 | 0 | 0 | 5 | 0 | 0 | 0 | 0 | 0 |
| $z_4$ | 5 | 0 | 0 | 0 | 0 | 0 | 0 | 5 | 0 | 0 | 0 | 0 | 0 | 5 | 0 | 0 | 0 | 0 | 0 | 0 |
| $z_5$ | 5 | 0 | 0 | 0 | 0 | 0 | 0 | 5 | 0 | 0 | 0 | 0 | 0 | 0 | 5 | 0 | 0 | 0 | 0 | 0 |
| $z_6$ | 5 | 0 | 0 | 0 | 0 | 0 | 0 | 0 | 5 | 0 | 0 | 0 | 0 | 0 | 5 | 0 | 0 | 0 | 0 | 0 |

Symbol Alphabet: $z_i \in Z_{(20, 3)} \mid z_i = \{z_1, \ldots, z_6\}$

Table 3a displays nonoverlapping results for the cross correlation between symbol $z_1$ and $y \in Y_{(20,3)} \mid y_j = \{z_1z_1, z_1z_2, z_2z_1, z_2z_2\}$. The peak values relate to the number of pulses that in this case is 75. The existence of a peak at indices 1 or 21 indicates good locations while peak values at any other indices indicate overlapping symbol combinations. Table 3b displays overlapping results for the cross correlation between symbol $z_1$ and $y \in Y_{(20,3)} \mid y_j = \{z_1z_1, z_1z_3, z_3z_1, z_3z_3\}$. The first two rows demonstrate good peak values at indices 1 and 21 while rows three and four show peak values at index 15. This indicates that symbols $z_1$ and $z_3$ form overlapping pairs and cannot be used together for data transmission.

that consists of a 6×2 array of nonoverlapping symbols available to transmit in the (Q, n)=(20, 3) combination. This means that a transmitter can send one bit of binary codewords per $Z_{(20,3)}$ symbol. Once a row $s_i \in S_{(20,3)}$ is chosen as a transmit pair, all other rows become unusable for transmission.

This process was repeated for all $z \in Z_{(Q,n)}$ and $y \in Y_{(Q,n)}$. Table 4 displays the array (row, column) sizes for the solution set $S_{(Q,n)}$.

TABLE 3

Example cross correlation results for $\Phi_{(20, 3)}$

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| (a) nonoverlapping | | | | | | | | | | | | | | | | | | | | |
| $\Phi(z_1, y_{11})$ | 75 | 0 | 0 | 0 | 0 | 0 | 50 | 0 | 25 | 0 | 0 | 0 | 25 | 0 | 50 | 0 | 0 | 0 | 0 | 0 |
| $\Phi(z_1, y_{12})$ | 75 | 0 | 0 | 0 | 0 | 0 | 50 | 0 | 25 | 0 | 0 | 0 | 25 | 0 | 50 | 0 | 0 | 0 | 0 | 0 |
| $\Phi(z_1, y_{21})$ | 50 | 25 | 0 | 0 | 0 | 0 | 25 | 25 | 25 | 0 | 0 | 0 | 0 | 25 | 50 | 0 | 0 | 0 | 0 | 0 |
| $\Phi(z_1, y_{22})$ | 50 | 25 | 0 | 0 | 0 | 0 | 25 | 25 | 25 | 0 | 0 | 0 | 0 | 25 | 50 | 0 | 0 | 0 | 0 | 0 |
| (b) overlapping | | | | | | | | | | | | | | | | | | | | |
| $\Phi(z_1, y_{11})$ | 75 | 0 | 0 | 0 | 0 | 0 | 50 | 0 | 25 | 0 | 0 | 0 | 25 | 0 | 50 | 0 | 0 | 0 | 0 | 0 |
| $\Phi(z_1, y_{13})$ | 75 | 0 | 0 | 0 | 0 | 0 | 50 | 0 | 25 | 0 | 0 | 0 | 25 | 0 | 50 | 0 | 0 | 0 | 0 | 0 |
| $\Phi(z_1, y_{31})$ | 50 | 0 | 25 | 0 | 0 | 0 | 25 | 0 | 50 | 0 | 0 | 0 | 0 | 0 | 75 | 0 | 0 | 0 | 0 | 0 |
| $\Phi(z_1, y_{33})$ | 50 | 0 | 25 | 0 | 0 | 0 | 25 | 0 | 50 | 0 | 0 | 0 | 0 | 0 | 75 | 0 | 0 | 0 | 0 | 0 |

| | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| (a) nonoverlapping | | | | | | | | | | | | | | | | | | | | |
| $\Phi(z_1, y_{11})$ | 75 | 0 | 0 | 0 | 0 | 0 | 50 | 0 | 0 | 0 | 0 | 0 | 25 | 0 | 0 | 0 | 0 | 0 | 0 | 0 |
| $\Phi(z_1, y_{12})$ | 50 | 25 | 0 | 0 | 0 | 0 | 25 | 25 | 0 | 0 | 0 | 0 | 0 | 25 | 0 | 0 | 0 | 0 | 0 | 0 |
| $\Phi(z_1, y_{21})$ | 75 | 0 | 0 | 0 | 0 | 0 | 50 | 0 | 0 | 0 | 0 | 0 | 25 | 0 | 0 | 0 | 0 | 0 | 0 | 0 |
| $\Phi(z_1, y_{22})$ | 50 | 25 | 0 | 0 | 0 | 0 | 25 | 25 | 0 | 0 | 0 | 0 | 0 | 25 | 0 | 0 | 0 | 0 | 0 | 0 |
| (b) overlapping | | | | | | | | | | | | | | | | | | | | |
| $\Phi(z_1, y_{11})$ | 75 | 0 | 0 | 0 | 0 | 0 | 50 | 0 | 0 | 0 | 0 | 0 | 25 | 0 | 0 | 0 | 0 | 0 | 0 | 0 |
| $\Phi(z_1, y_{13})$ | 50 | 0 | 25 | 0 | 0 | 0 | 25 | 0 | 25 | 0 | 0 | 0 | 0 | 0 | 25 | 0 | 0 | 0 | 0 | 0 |
| $\Phi(z_1, y_{31})$ | 75 | 0 | 0 | 0 | 0 | 0 | 50 | 0 | 0 | 0 | 0 | 0 | 25 | 0 | 0 | 0 | 0 | 0 | 0 | 0 |
| $\Phi(z_1, y_{33})$ | 50 | 0 | 25 | 0 | 0 | 0 | 25 | 0 | 25 | 0 | 0 | 0 | 0 | 0 | 25 | 0 | 0 | 0 | 0 | 0 |

Eliminating the ($\phi_{ziyj}$ or $\phi_{zkyj}$) with overlapping peaks yields a nonoverlapping solution set $$S_{(20,3)} = \begin{pmatrix} z_1 & z_2 \\ z_2 & z_3 \\ z_2 & z_6 \\ z_3 & z_5 \\ z_4 & z_6 \\ z_5 & z_6 \end{pmatrix}.$$

TABLE 4

Array sizes for the solution set $S_{(Q, n)}$

| (Q ↓, n →) | 2 | 3 | 4 | 5 |
|---|---|---|---|---|
| 14 | — | — | — | — |
| 16 | 4 × 2 | — | — | — |
| 18 | 8 × 3 | — | — | — |
| 20 | 8 × 4 | 6 × 2 | — | — |
| 22 | 7 × 5 | 26 × 5 | — | — |
| 24 | 11 × 6 | 125 × 9 | — | — |
| 26 | 7 × 7 | — | 12 × 2 | — |
| 28 | 6 × 8 | — | 1066 × 8 | — |

TABLE 4-continued

Array sizes for the solution set $S_{(Q,n)}$

| (Q ↓, n →) | 2 | 3 | 4 | 5 |
|---|---|---|---|---|
| 30 | 8 × 9 | — | — | — |
| 32 | 4 × 10 | — | — | 49 × 3 |

Null values here indicate that all symbols within $Z_{(Q,n)}$ overlapped, or the array size may have been too large to calculate results with the equipment used in this example; however, use of a more robust processing device and/or more memory would have allowed the process to yield results for all values. The number of rows indicate the number of nonoverlapping pairs available for transmit, though only one pair may be chosen for a specific transmit-receive channel. The column field indicates the number of nonoverlapping symbols in a (Q, n) combination. Depending on transceiver characteristics, one may choose between operating within a certain (Q, n) combination and transmitting the available bits per symbol inside that group, or determining the number of bits per symbol to transmit and choosing the appropriate (Q, n) combination that satisfies the data throughput characteristics.

Given the large numbers of rows in each (Q, n) combination and the feature that only one row can operate on a channel at a given time, Hamming and Manhattan distances may be used to compare differences between codewords [13]. Hamming distance is calculated as $$d_H(\pi, \pi') = \sum_{i=1}^{n} d_i \text{ where } d_i = \begin{cases} 0, & \text{if } \pi = \pi' \\ 1, & \text{otherwise} \end{cases} \quad (14)$$

and Manhattan distance is calculated as $$d_M(\pi, \pi') = \sum_{i=1}^{n} |\pi_i - \pi'_i|. \quad (15)$$

For example, the (20, 3) combination $(d_H, d_M)$ pair is $$(d_{H(s_i)} \quad d_{M(s_i)}) = \begin{pmatrix} 2 & 1 \\ 2 & 1 \\ 4 & 3 \\ 2 & 1 \\ 4 & 2 \\ 2 & 1 \end{pmatrix}. \quad (16)$$

This shows that the $s_3=\{z_2 z_6\}$ pair has greater differences among each other than any of the other pairs.

Figure 12:
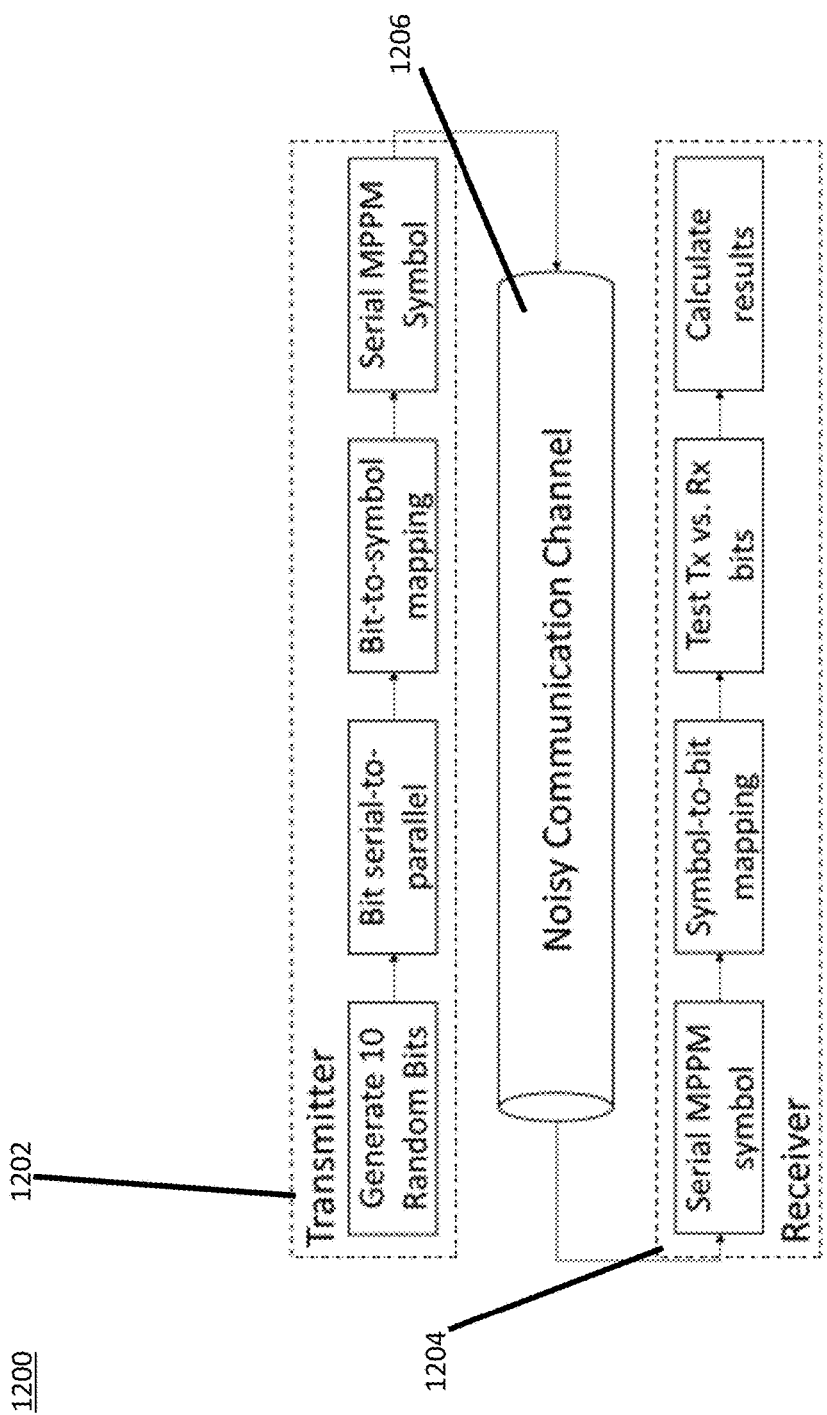
FIG. 12 is a block diagram of an example system for multipulse-pulse position modulation optical transmission, in accordance with one or more disclosed aspects.

FIG. 12 is a schematic flow diagram showing a system 1200 for simulating transmission of the symbol pairs through a communication channel. The system 1200 may include a transmitter 1202, a receiver 1204, and a communication channel 1206, which may be a noisy communication channel in this example. The simulation may be simulated in a computational program, such as MATLAB and may test the symbol pairs through a noisy communication channel. The simulation generated 10 random bits, converted the bits from serial-to-parallel, mapped the bits-to-symbols, and transmitted the symbols through a noisy channel 1206. The receiver 1204 conducted the inverse operations as the transmitter 1202.

The noise channel is composed of interference pulses in the time slots that are modeled using a Poisson random process, specified by its probability mass function [14] as $$f_j[j] = \frac{\lambda^j}{j!} e^{-\lambda}, j \geq 0 \quad (17)$$

where $\lambda$ is the average arrival rate. The arrival rate ranged from $\lambda=0.005$ to $\lambda=10.24$ with the number of interference pulses ranging from (0-200) slots.

Each pair from (13) was tested, and the results are displayed in Table 5. The first column of s(20,3) was assigned the zero bit and the right column was assigned the one bit. Bits were converted to symbol representations and transmitted sequentially according to the bit pattern (1,1,0, 0,0,0,1,0,1,0). Interference pulses were added according to the noise profile listed above. The known zero and one symbol representations were cross correlated with the received signals and results plotted as in FIGS. 13 and 14. Each pair was able to transmit and recover an average between (8-10) bits through the channel with the Poisson process arrival rate between (0.005-0.32).

Figure 13:
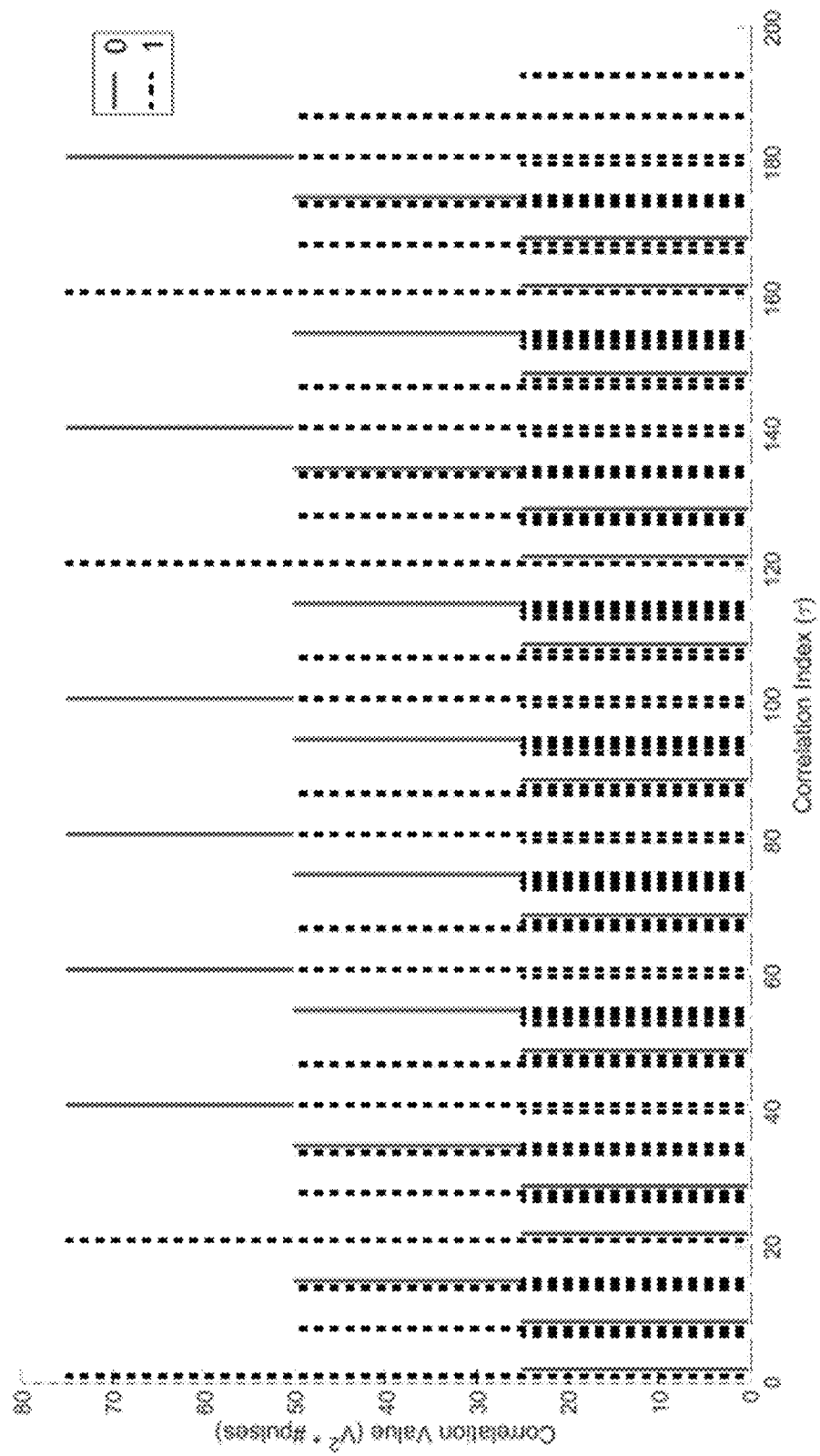
FIG. 13 is a graph of an example cross correlation, in accordance with one or more disclosed aspects.

FIG. 13 displays the results of the first nonoverlapping pair $s_{1(20,3)}$ received over the channel with $\lambda=0.005$. The blue lines represent correlation indices that the receiver determined with the zero symbol correlation and the red lines represent indices where the one symbol was correlated. The receiver was able to correlate all 10 bits transmitted based on the synchronization pulse and symbol pulses. Good peak positions are displayed at the first and then every following Q indices (1, 21, 41, 61, . . . , 181).

Figure 14:
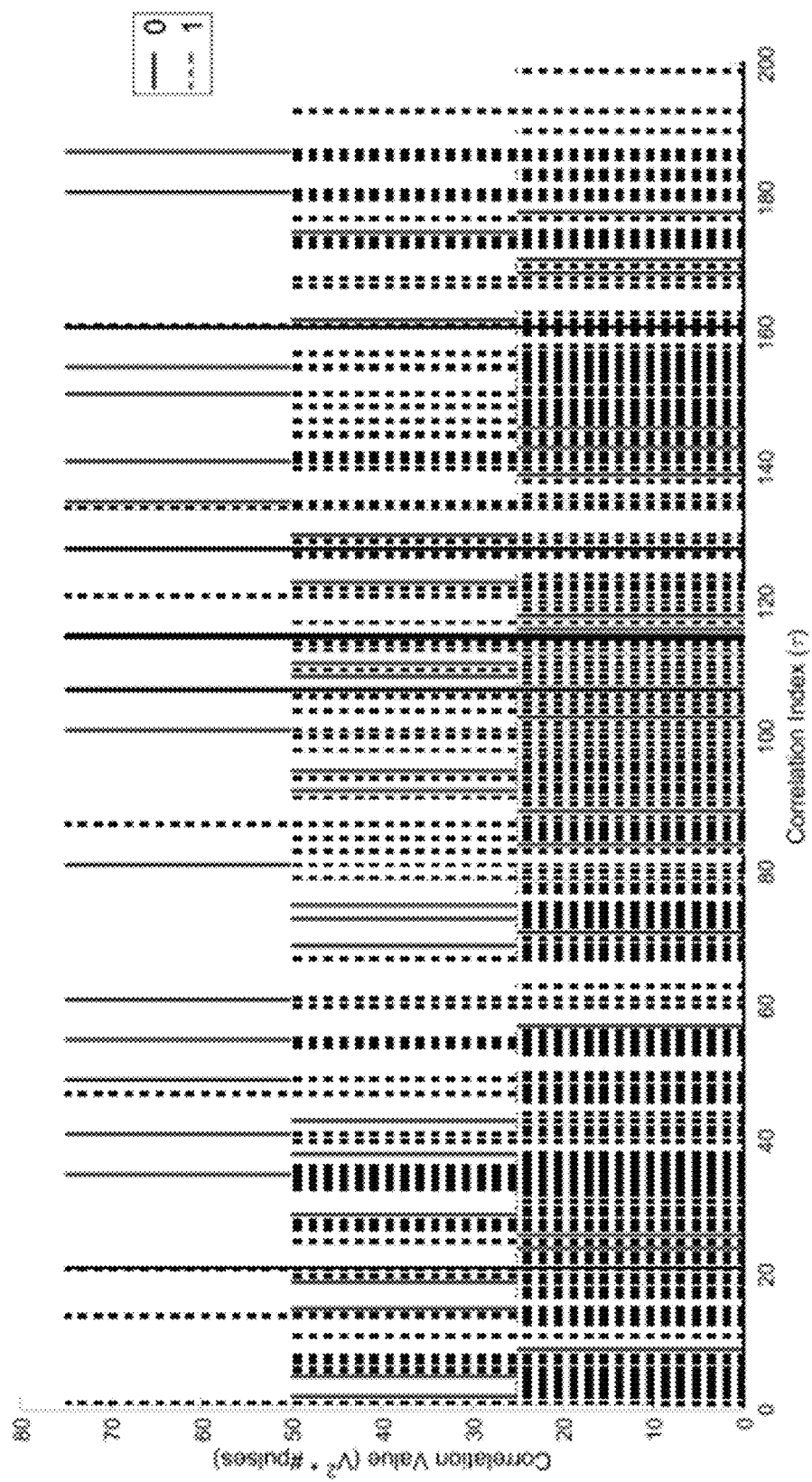
FIG. 14 is a graph of an example cross correlation, in accordance with one or more disclosed aspects.

FIG. 14 displays the results of the same $s_{1(20,3)}$ pair received over the channel with $\lambda=0.32$. The blue and red lines indicate the same zero or one bit correlations as previously discussed; however, the existence of the black lines now show correlation indices where the receiver correlated both a zero and one bit symbol. This identifies locations where the receiver cannot determine the transmitted bit. The increased noise caused the receiver to identify more peak correlation values than in FIG. 13; however, due to the addition of the synchronization pulse, the peak values at specific indices are of as listed above are of relevance in this example. Therefore, the receiver was able to identify all but two of the ten bits transmitted as shown in Table 5.

TABLE 5

Simulation Results

| | | Arrival Rate (λ) | | | | | | | | | | | | |
|---|---|---|---|---|---|---|---|---|---|---|---|---|---|---|
| | | 0.005 | 0.01 | 0.02 | 0.04 | 0.08 | 0.16 | 0.32 | 0.64 | 1.28 | 2.56 | 5.12 | 10.24 | Total Avg |
| | | | | | | | Total Interferers | | | | | | | |
| Pair | | 0 | 1 | 4 | 10 | 7 | 37 | 49 | 102 | 156 | 190 | 199 | 200 | |
| z1, z2 | # of | 0 | 0 | 0 | 0 | 1 | 3 | 2 | 3 | 9 | 10 | 10 | 10 | 48  4 |
| z2, z3 | unrecoverable | 0 | 0 | 0 | 1 | 0 | 2 | 3 | 7 | 7 | 8 | 10 | 10 | 48  4 |
| z7, z6 | bits | 0 | 0 | 0 | 1 | 0 | 1 | 1 | 4 | 6 | 8 | 10 | 10 | 41  3 |
| z3, z5 | | 0 | 0 | 1 | 0 | 0 | 3 | 0 | 8 | 8 | 10 | 10 | 10 | 50  4 |
| z4, z6 | | 0 | 0 | 0 | 1 | 0 | 0 | 1 | 4 | 6 | 8 | 10 | 10 | 40  3 |
| z5, z6 | | 0 | 0 | 0 | 1 | 0 | 1 | 3 | 6 | 8 | 10 | 10 | 10 | 49  4 |
| | Total | 0 | 0 | 1 | 4 | 1 | 10 | 10 | 32 | 44 | 54 | 60 | 60 | 276  23 |
| | Avg | 0 | 0 | 0 | 1 | 0 | 2 | 2 | 5 | 7 | 9 | 10 | 10 | 46 |

This demonstrates the power of the synchronization pulse when included in the frame generation. This simulation demonstrates practical capabilities of the symbol generation approach, such as described herein.

Aspects described herein provide a practical nonoverlapping self-synchronizing MPPM scheme capable of operation over optical communication channels. One or more embodiments provide for a binary to VLC transmission path with interference pulses following Poisson probability models. Described aspects identify a relationship between throughput and symbols, introduced transmitter operating characteristics, stabilized frame length, and introduced practical frame synchronization methods. Aspects described herein provide the ability to quantify the number of nonoverlapping symbols and introduced common distance measurement comparison techniques. One or more embodiments describe simulated results with a successful transmission over a channel with interference modeled as a Poisson random process.

Figure 15:
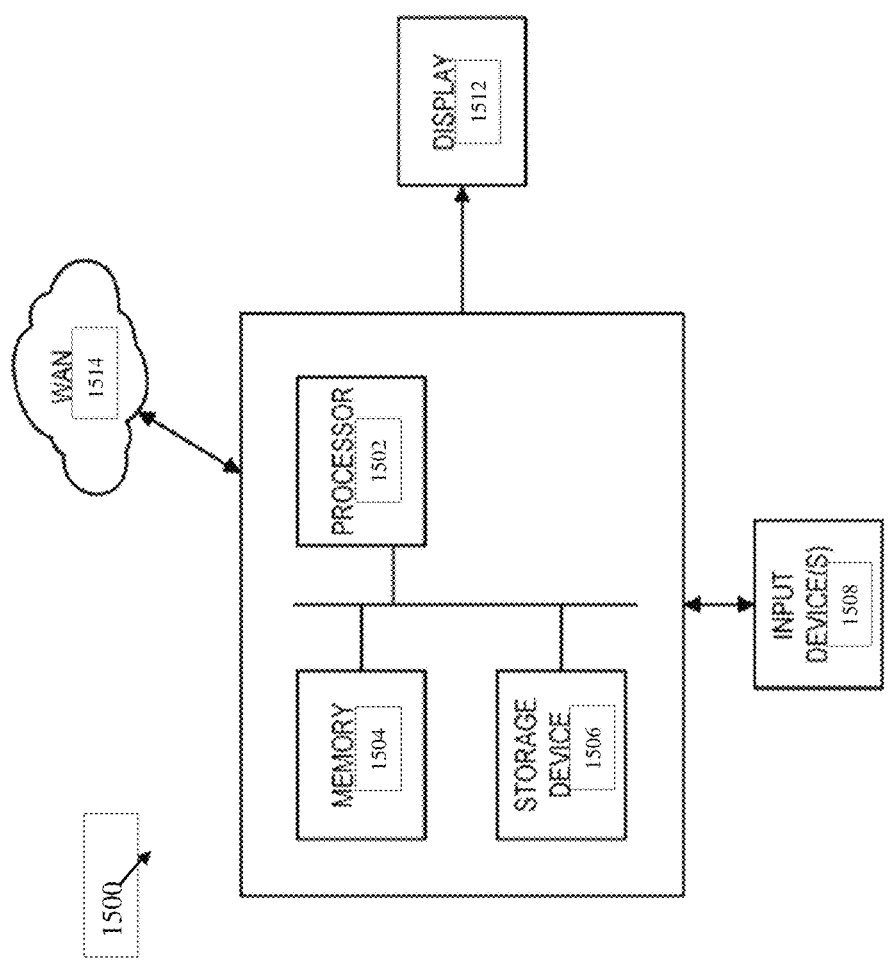
FIG. 15 is a diagram of an example computer system, in accordance with one or more disclosed aspects.

One or more components, aspects, and processes described herein may be implemented on virtually any type of computer regardless of the platform being used. For example, as shown in FIG. 15, a computer system 1500 includes a processor 1502, associated memory 1504, a storage device 1506, and numerous other elements and functionalities typical of today's computers (not shown). The computer 1500 may also include input means 1508, such as a keyboard and a mouse, and output means 1512, such as a monitor or LED. The computer system 1500 may be connected to a local area network (LAN) or a wide area network (e.g., the Internet) 1514 via a network interface connection (not shown). Those skilled in the art will appreciate that these input and output means may take other forms.

Further, those skilled in the art will appreciate that one or more elements of the aforementioned computer system 1500 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions (e.g., computer code, etc.) to perform embodiments of the disclosure may be stored on a computer-readable medium (i.e., a non-transitory computer-readable medium) such as a compact disc (CD), a diskette, a tape, a file, or any other computer readable storage device (e.g., a non-transitory computer-readable medium or device).

Methods and system for multipulse-pulse position modulation optical transmission have been described. Although particular embodiments, aspects, and features have been described and illustrated, one skilled in the art would readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

REFERENCES

[1] Commercial Buildings Energy Consumption Survey (CBECS). https://www.eia.gov/consumption/commercial/reports/2012/lighting/. 17 May 2017.
[2] Rajagopal, Sridhar, Roberts, Richard, Lim, Sang-Kyu. IEEE 802.15.7 Visible Light Communication: Modulation Schemes and Dimming Support. Topics in Standards. IEEE Communications Magazine. March 2012.
[3] Haykin, Simon, Moher, Michael, Introduction to Analog and Digital Communications Second Edition, 2007 John Wiley and Sons, Inc., p.14, p.100, p.198-207.
[4] Stallings, William. Data and Computer Communications 10th edition. 2014 Pearson Education Inc, publishing as Prentice Hall. p.247-248, p.250.
[5] Veldi, Ramaiah and Georghiades, Costas N. Frame Synchronization for Optical Multi-pulse Pulse Position Modulation. IEEE Transactions on Communications, vol. 43, no. 2/3/4, February/March/April 1995.
[6] Ghosna, F. J. and Sibley, M. J. N. Pulse Position Modulation Coding Schemes for Optical Intersatellite Links. Electronics Letters 18 Feb. 2010 Vol. 46 No. 4.
[7] Veldi, Ramaiah and Georghiades, Costas N., On Symbol Synchronization of MPPM Sequences, IEEE Transactions on Communications, Vol. 46, No. 5, May 1998.
[8] Fujiwara, Yuichiro. Self-Synchronizing Pulse Position Modulation with Error Tolerance. IEEE Transactions on Information Theory, vol. 59, no. 9, September 2013.

[9] Chumchewkul, D. Performance Evaluation of VPPM Visible Light Communications Based on Simulation with Experiment's Parameters. 2018 15th International Conference on Electrical Engineering/Electronics, Computer, Telecommunications and Information Technology (ECTI-CON).

[10] Simon, M. K. and Vilnrotter, V. A., Multi-Pulse Pulse-Position Modulation Signaling for Optical Communication with Direct Detection. IPN Progress Report 42-155, 15 Nov. 2003.

[11] Li, Jing et al. Dual-Pulse Pulse Position Modulation (DPPM) for Deep-Space Optical Communications: Performance and Practicality Analysis. NASA/TM-2012-216042. November 2012.

[12] Oppenheim, Alan V., Willsky, Alan S., Signals and Systems Second edition. 1997 Prentice-Hall Inc., p. 168.

[13] Rathod, Abhay B., Gulhane, Snajay M., Padalwar, Shailesh R. A Comparative Study on Distance Measuring Approaches for Permutation Representations. 2016 IEEE International Conference on Advances in Electronics, Communication and Computer Technology (ICAECCT) Rajarshi Shahu College of Engineering, Pune India. Dec. 2-3, 2016.

[14] Therrien, Charles W. and Tummala Murali, Probability and Random Processes for Electrical Engineers Second Edition, 2012 CRC Press. p.347

[15] L. Vashishtha, "Engineering made easy: pulse position modulation (PPM)", 20 Mar. 2018. [Online]. Available: https://www.youtube.com/watch?v=DsbSk_Lp4-A

What is claimed is:

1. A method for multipulse-pulse position modulation optical transmission comprising:
    selecting a multipulse-pulse position modulation having a symbol alphabet having an upper-bound symbol alphabet size, each symbol in the symbol alphabet having a first quantity of pulse slots per frame (Q) and second quantity of pulsed positions in each frame (n);
    determining, based on at least one transmission characteristic associated with a transmitter, a subset of symbols of the selected symbol alphabet capable of being transmitted by the transmitter, the subset of symbols having a set of binary codewords;
    identifying every two-symbol concatenation of binary codewords in the set of binary codewords;
    calculating a cross correlation of every binary codeword in the set of binary code words through every two-symbol concatenation;
    determining a set of one or more acceptable codeword combinations by eliminating a portion of two-symbol concatenation of codewords corresponding to overlapping peaks in the respective calculated cross correlations; and
    transmitting, by the transmitter via an optical communication channel, information encoded based on the determined acceptable codeword combinations.

2. The method of claim 1,
    wherein selecting comprises selecting the symbol alphabet based on one or more characteristics associated with a receiver; and
    wherein transmitting comprises transmitting the encoded information toward the receiver.

3. The method of claim 1, further comprising:
    mapping, by the transmitter, the determined set of one or more acceptable codeword combinations to one or more respective unique symbols;
    encoding the information as a first set of the one or more unique symbols based on the mapping;
    arranging the first set of one or more unique symbols in a serial manner; and
    transmitting the first set of one or more unique symbols via the optical communication channel.

4. The method of claim 3, wherein each unique symbol comprises a frame having a synchronization pulse and one or more symbol pulses, wherein the synchronization pulse is an initial pulse in the frame.

5. The method of claim 4, wherein slot placement of the one or more symbol pulses identifies the respective unique symbol.

6. The method of claim 4, further comprising padding at least one of the unique symbols to generate a constant frame length in every unique symbol.

7. The method of claim 3, wherein the one or more unique symbols are nonoverlapping symbols.

8. The method of claim 3, wherein transmitting the first set of one or more unique symbols comprises transmitting the first set of one or more unique symbols to a receiver, wherein the transmission causes the receiver to perform an inverse mapping operation on the first set of one or more unique symbols for matching, by the receiver, each of the one or more unique symbols to a corresponding binary representation.

9. A system for multipulse-pulse position modulation optical transmission comprising:
    a processing device configured to:
        select a multipulse-pulse position modulation having a symbol alphabet having an upper-bound symbol alphabet size, each symbol in the symbol alphabet having a first quantity of pulse slots per frame (Q) and second quantity of pulsed positions in each frame (n);
        determine, based on at least one transmission characteristic associated with a transmitter, a subset of symbols of the selected symbol alphabet capable of being transmitted by the transmitter, the subset of symbols having a set of binary codewords;
        identify every two-symbol concatenation of binary codewords in the set of binary codewords;
        calculate a cross correlation of every binary codeword in the set of binary code words through every two-symbol concatenation; and
        determine a set of one or more acceptable codeword combinations by eliminating a portion of two-symbol concatenation of codewords corresponding to overlapping peaks in the respective calculated cross correlations; and
    a transmitter configured to transmit, via an optical communication channel, information encoded based on the determined acceptable codeword combinations.

10. The system of claim 9,
    wherein selecting comprises selecting the symbol alphabet based on one or more characteristics associated with a receiver; and
    wherein transmitting comprises transmitting the encoded information toward the receiver.

11. The system of claim 10, wherein the transmitter is further configured to:
    map the determined set of one or more acceptable codeword combinations to one or more respective unique symbols;
    encode the information as a first set of the one or more unique symbols based on the mapping;
    arrange the first set of one or more unique symbols in a serial manner; and transmit the first set of one or more unique symbols via the optical communication channel.

12. The system of claim 11, wherein each unique symbol comprises a frame having a synchronization pulse and one or more symbol pulses, wherein the synchronization pulse is an initial pulse in the frame.

13. The system of claim 12, wherein slot placement of the one or more symbol pulses identifies the respective unique symbol.

14. The system of claim 12, further comprising padding at least one of the unique symbols to generate a constant frame length in every unique symbol.

15. The system of claim 11, wherein the one or more unique symbols are nonoverlapping symbols.

16. The system of claim 11, wherein the transmitter is further configured to transmit the first set of one or more unique symbols to a receiver, wherein the transmission causes the receiver to perform an inverse mapping operation on the first set of one or more unique symbols for matching, by the receiver, each of the one or more unique symbols to a corresponding binary representation.

17. A non-transitory computer readable medium comprising computer code for multipulse-pulse position modulation optical transmission, the computer code, when executed by a processor, performing steps to:
select a multipulse-pulse position modulation having a symbol alphabet having an upper-bound symbol alphabet size, each symbol in the symbol alphabet having a first quantity of pulse slots per frame (Q) and second quantity of pulsed positions in each frame (n);
determine, based on at least one transmission characteristic associated with a transmitter, a subset of symbols of the selected symbol alphabet capable of being transmitted by the transmitter, the subset of symbols having a set of binary codewords;
identify every two-symbol concatenation of binary codewords in the set of binary codewords;
calculate a cross correlation of every binary codeword in the set of binary code words through every two-symbol concatenation;
determine a set of one or more acceptable codeword combinations by eliminating a portion of two-symbol concatenation of codewords corresponding to overlapping peaks in the respective calculated cross correlations; and
cause transmission, by the transmitter via an optical communication channel, information encoded based on the determined acceptable codeword combinations.

18. The non-transitory computer readable medium of claim 17,
wherein selecting comprises selecting the symbol alphabet based on one or more characteristics associated with a receiver; and
wherein transmitting comprises transmitting the encoded information toward the receiver.

19. The non-transitory computer readable medium of claim 17, wherein the computer code, when executed by the processor, causing the transmitter to:
map the determined set of one or more acceptable codeword combinations to one or more respective unique symbols;
encode the information as a first set of the one or more unique symbols based on the mapping;
arrange the first set of one or more unique symbols in a serial manner; and
transmit the first set of one or more unique symbols via the optical communication channel.

20. The non-transitory computer readable medium of claim 19, wherein each unique symbol comprises a frame having a synchronization pulse and one or more symbol pulses, wherein the synchronization pulse is an initial pulse in the frame.

* * * * *